United States Patent [19]
Gutleber

[11] 3,889,199
[45] June 10, 1975

[54] METHOD AND APPARATUS FOR ADAPTIVELY SUPPRESSING UNWANTED LOBES IN A COMPRESSED CODED RADAR SIGNAL

[75] Inventor: Frank S. Gutleber, Little Silver, N.J.

[73] Assignee: The United States of America as represented by the Secretary of the Army, Washington, D.C.

[22] Filed: May 22, 1974

[21] Appl. No.: 472,323

[52] U.S. Cl. ............... 328/163; 328/164; 328/167; 343/7 A; 343/17.2 PC
[51] Int. Cl. ............................................. H03b 1/04
[58] Field of Search ........................... 328/162–164, 328/165, 167; 343/7 A, 5 DP, 17.1 R, 17.2 PC

[56] References Cited
UNITED STATES PATENTS
3,150,368  9/1964  Price ........................... 343/17.2 PC

*Primary Examiner*—James B. Mullins
*Attorney, Agent, or Firm*—Nathan Edelberg; Robert P. Gibson; Jeremiah G. Murray

[57] ABSTRACT

Unwanted lobes in a compressed, coded radar signal are adaptively eliminated by generating a local coded pulse corresponding precisely to the coded pulse of the signal component producing the interfering lobes. The locally generated signal is then compressed in a matched filter and subtracted from the composite input signal to eliminate its interfering lobes.

9 Claims, 2 Drawing Figures

METHOD AND APPARATUS FOR ADAPTIVELY SUPPRESSING UNWANTED LOBES IN A COMPRESSED CODED RADAR SIGNAL

GOVERNMENT LICENSE

The invention described herein may be manufactured and used by or for the Government for governmental purposes, without the payment of any royalties thereon or therefor.

BACKGROUND OF THE INVENTION

1. Field of the Invention

Broadly speaking, this invention relates to methods and apparatus for processing coded electrical signals. More particularly, in a preferred embodiment, this invention relates to methods and apparatus for adaptively eliminating unwanted lobes in a compressed, coded radar signal, and the like.

2. Discussion of the Prior Art

In an attempt to overcome the peak power limitations of practical radar systems, the outgoing transmitter pulses have been coded by transmitting a series of pulses of differing phase or amplitude. The echoes returning from the targets are, of course, also coded, and by suitably manipulating the returning pulses, for example, by compression in a matched filter, system range resolution may be retained if the coded signal is compressed to a lobeless impulse. Unfortunately, most practical coded systems do not provide a compressed lobeless impulse signal. Unwanted side lobes are generated in the matched filter, and the interference experienced between the lobes of the compressed return signals limits the resolution of the system to a level which may be less than adequate for some critical applications. The problem, then, is to devise methods and apparatus whereby these interfering lobes may be adaptively suppressed, thus, permitting the successful detection of targets which are positioned in close proximity to one another, even when the targets produce echoes of widely differing amplitude.

SUMMARY OF THE INVENTION

As a solution to this, and other problems, the present invention contemplates a method of adaptively eliminating unwanted lobes in a compressed, coded signal. The first step in the method is to generate a train of pulses corresponding in amplitude and phase to the peak amplitude of the main lobes in said coded signal. Next, each of the pulses in the train is encoded by the use of the same coding scheme which was employed to generate the coded signal. Then, the now encoded pulses are compressed in a matched filter and subtracted from the coded signal, thereby cancelling from the coded signal those lobes which correspond to the lobes which were generated by the component of the coded signal contributing to the peak amplitude signal.

To practice the above method, apparatus is provided for adaptively eliminating unwanted lobes in a compressed, coded signal. The apparatus comprises a threshold detector for receiving the coded signal, the detector having its threshold level set to detect lobes in the coded signal which exceed a predetermined amplitude level.

This apparatus also includes a pulse generator, connected to and driven by the output of the threshold detector, for generating a train of pulses synchronized with the lobes in the coded signal which are of peak amplitude, and means, connected to the pulse generator, for adjusting the amplitude of each pulse in the train to the aforementioned peak amplitude. Also included in the apparatus are means, connected to the output of the amplitude adjusting means, for encoding each pulse in the pulse train using the same coding scheme employed to generate the coded signal, and a matched filter, connected to the output of the encoding means, for compressing each encoded pulse in the pulse train. Finally, the apparatus includes means for subtracting the compressed pulses from the coded signal, thereby to eliminate lobes in the coded signal associated with the lobes detected by the threshold detector.

The invention and its mode of operation will be more fully understood from the following detailed description, when taken in conjunction with the drawing, in which:

DETAILED DESCRIPTION OF THE INVENTION

Figure 1:
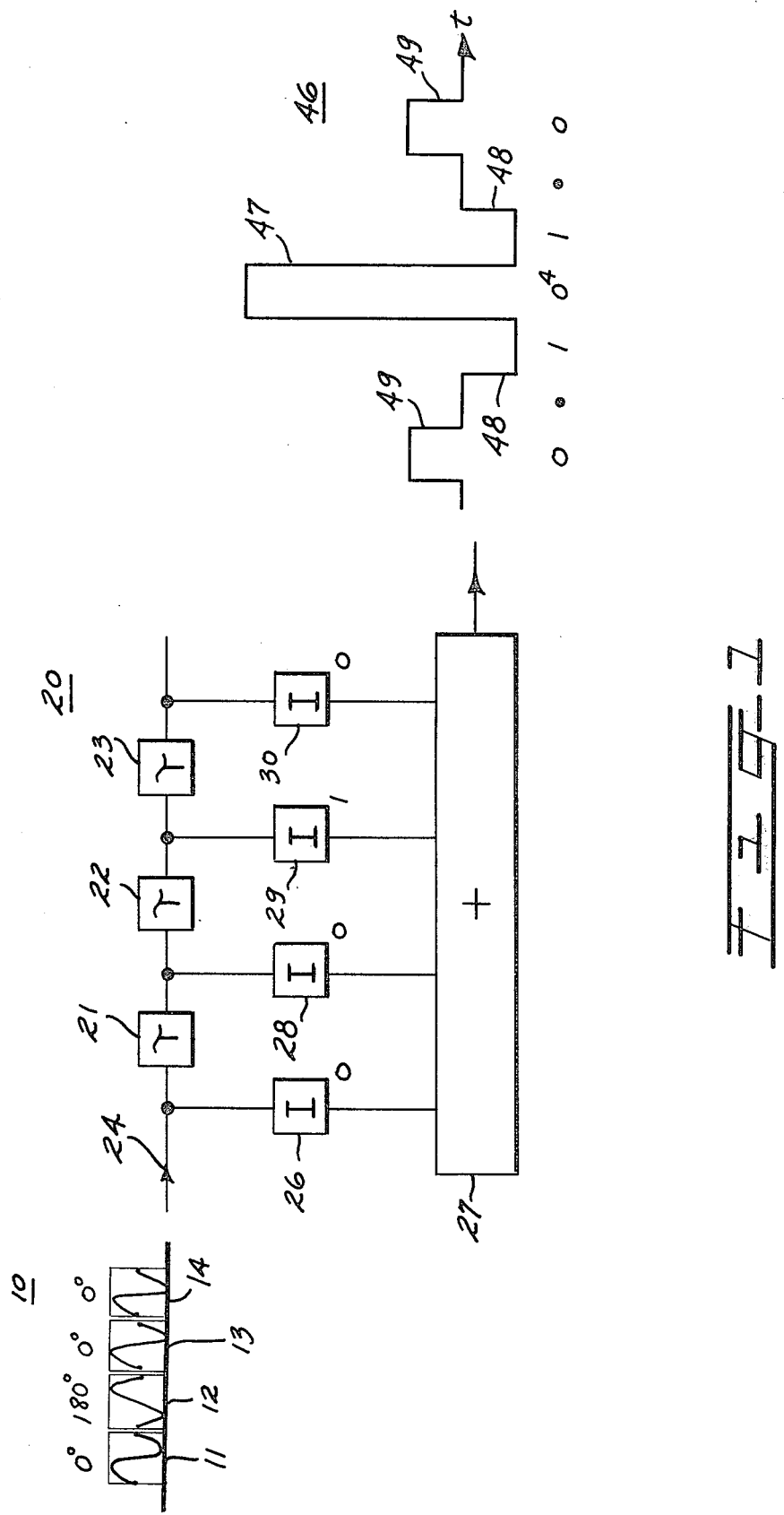
FIG. 1 is a schematic drawing of an illustrative matched filter, together with a typical encoded radar pulse.

FIG. 1 depicts a typical coded radar pulse 10. To simplify the explanation of the invention this pulse is shown as comprising four sub-pulses 11, 12, 13 and 14. However, it should be understood that in actual practice the coded pulse 10 may comprise as many as seven or more sub-pulses and the invention is not limited to the particular pulse shown. It should also be understood that while the component sub-pulses comprising pulse 10 are shown as being encoded in terms of phase variations, this encoding could also be accomplished by effecting frequency or amplitude variations between adjacent sub-pulses and the invention is not merely limited to phase variation encoding. Also, to further simplify explanation of the invention, a convention has been adopted wherein one pulse, for example, the 0° phase, is arbitrarily designated by the digit 0, while the other phase, for example, 180°, is arbitrarily designated by the digit 1. Thus, using this convention, addition of a 1 and a 0 pulse will result in a null, designated by a dot ".", whereas addition of two or more similar sub-pulses will result in a signal of the same phase but of correspondingly larger amplitude. For example, adding a 0 pulse to another 0 pulse yields a $0^2$ signal where the superscript 2 represents an amplitude not an exponent. Similarly, adding four 1 sub-pulses together yield a $1^4$ signal.

With this convention established, we can now turn to the operation of the invention.

As shown in FIG. 1, matched filter 20 comprises a plurality of serially connected delay elements 21–23, each having a delay $\tau$, where $\tau$ is the period of any one of the sub-pulses 11–14. The input to filter 20, on line 24, is connected to delay element 21 and, via an "inverting" stage 26, to one input of a summing stage 27. In like fashion, "inverting" stages 28–30 connect the outputs of delay elements 21–23, respectively, to other inputs of summing stage 27.

Not all of the inverting stages 26, and 28–30 are arranged to invert the signals which are applied to the inputs thereof. As will be seen, this is a function of the particular code employed. Also, the term invert is not used in its strict sense. If the modulation technique employed is phase modulation, a signal is considered inverted if it is changed from 0° phase to 180° phase, and vice-versa. Likewise, if frequency coding is employed, a signal is considered "inverted" if its frequency is changed from $f_1$ to $f_2$, and vice-versa. However, regardless of the coding scheme employed, when using the notation previously defined, inversion occurs whenever a 1 becomes a 0, and vice-versa.

Returning to FIG. 1, pulse 10 comprises a 0° sub-pulse, a 180° sub-pulse and two additional 0° sub-pulses. In the convention we have defined, pulse 10 is thus encoded 0100. The decision whether a particular inverting stage will be arranged to invert or not is determined by the particular coded pulse employed, starting with the last inverting stage and working forwards towards the first. Thus, if pulse 10 is coded 0100, inverting stage 30, being associated with a 0, will not invert, inverting stage 29, being associated with a 0 will also not invert, inverting stage 28, being associated with a 1, will invert, while inverting stage 26, being associated with a 0 will not invert.

The table below shows the output of each inverting stage as the coded pulse passes through the matched filter, the last row representing the summed output from summing stage 27 on lead 31.

| | | | | | | | |
|---|---|---|---|---|---|---|---|
| Inverter 26 | 0 | 1 | 0 | 0 | | | |
| Inverter 28 | | 0 | 1 | 0 | 0 | | |
| Inverter 29 | | | 1 | 0 | 1 | 1 | |
| Inverter 30 | | | | 0 | 1 | 0 | 0 |
| Summation | 0 | . | 1 | $0^4$ | 1 | . | 0 |

The shape of the summed pulse 46 is also shown in FIG. 1 as the output of matched filter 20. As will be seen, pulse 46 comprises a large central lobe 47 with smaller lobes 48—48 and 49—49 off to each side of the main lobe. It will be obvious to one skilled in the art, that if a side lobe of a strong return echo coincides in time with the main lobe of a weaker echo, detection of the weak signal will be difficult, if not impossible.

Accordingly, the invention disclosed herein is based on the discovery that this problem can be overcome by generating a local coded pulse in the radar receiver, and then adjusting its amplitude and phase to match that of the largest return echo in the received signal; compressing the pulse in a matched filter identical to that employed in the main portion of the receiver and, then, subtracting the locally generated compressed pulse from the received signal. If only two interfering return echoes are present, this procedure will leave the weaker echo in a condition suitable for detection, since the interfering lobes from the stronger signal will have been subtracted out from the received signal. If there are more than two interfering signals, this process is reiterated using the central or main lobe of the second signal to reveal the third signal, and so on.

Figure 2:
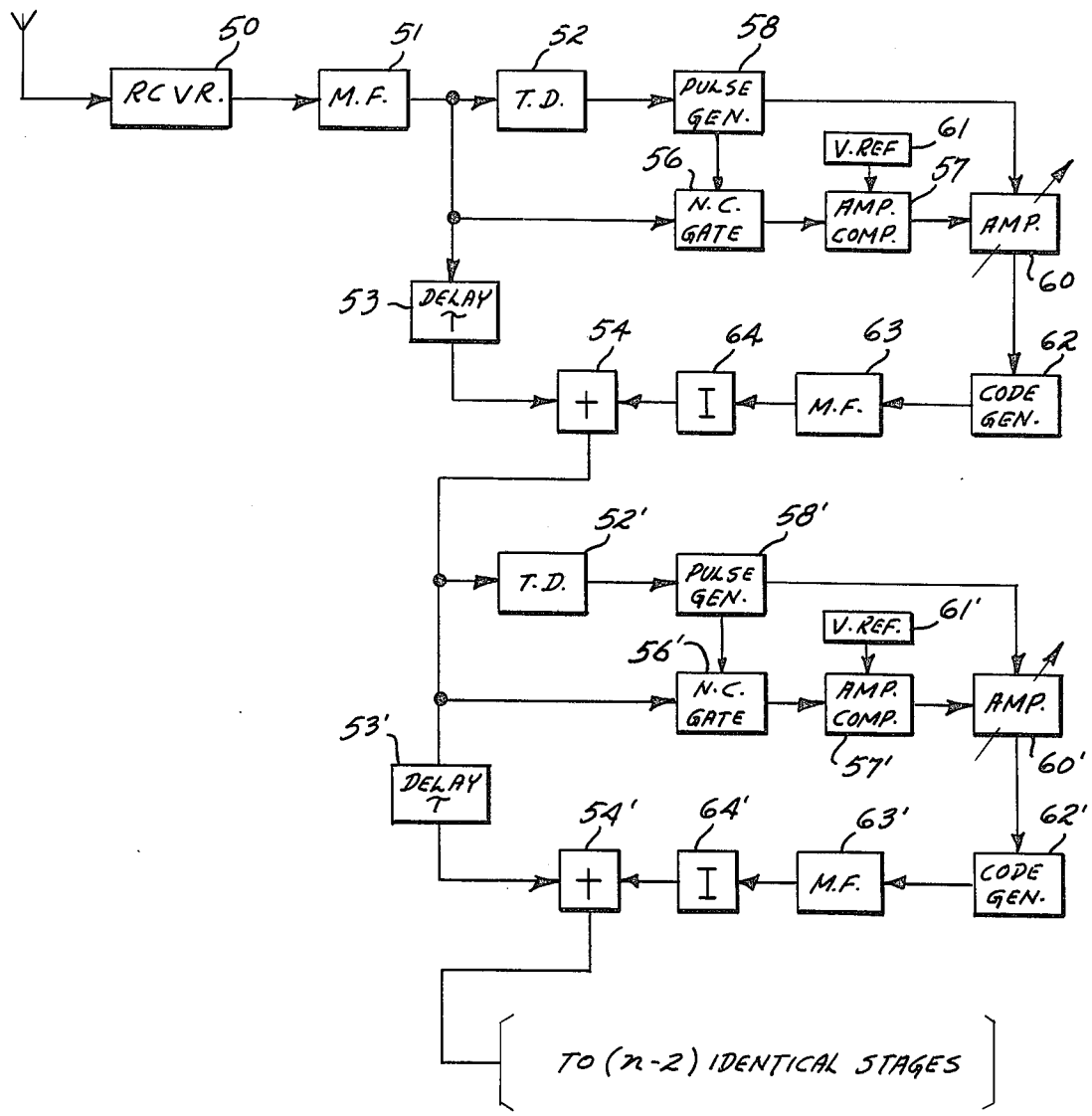
FIG. 2 is a block circuit diagram of an illustrative adaptive pulse lobe compression system according to this invention.

As shown in FIG. 2, one illustrative embodiment of the invention comprises a conventional radar receiver 50 connected to a matched filter 51, for example, the matched filter shown in FIG. 1.

The output from matched filter 51 is connected to a threshold detector 52 and, via a delay element 53, to one input of a summing stage 54. The output of matched filter 51 is also connected, via a normally closed logic gate 56, to the input of an amplitude comparator 57.

The output of threshold detector 52 is connected to the triggering input of a pulse generator 58 which has two outputs, one of which controls the state of gate 56, the other being connected to the input of a variable-gain amplifier 60.

A source of reference potential 61 is connected to amplitude comparator 57 and the result of the comparison made therein is connected to the control input of amplifier 60. The output of amplifier 60 is connected to a code generator 62. The output of code generator 62 is, in turn, compressed in a second matched filter 63, identical to filter 51, and after inversion in an inverter stage 64 is connected to another input of summing stage 54.

If only two interfering signals are present, the output of summing stage 54 may be detected and processed in the normal manner. However, if as will generally be the case, more than two interfering signals may be expected, additional circuitry identical to that just described, is provided. This is shown in FIG. 2 using a related numbering scheme for similar components. However, this additional circuitry will not be discussed in detail herein.

In operation, assume that the signal received by receiver 50 comprises the composite signal S, where:

$S = S_1 + S_2 + \ldots S_n$, and $S_1 > S_2 > S_i \ldots > S_n$.

Since $S_1$, $S_2$, etc. are return echoes from the same outgoing coded pulse, they too are encoded. Considering the worst possible condition, one of the side lobes from signal $S_1$ will interfere with the central lobe of signal $S_2$; one of the side lobes of signal $S_2$ will interfere with the central lobe of signal $S_3$; and so on.

The threshold of detector 52 is adjusted to discriminate between input signals $S_1$ and $S_2$, and the output from detector 52 is used to trigger pulse generator 58 which generates a series of pulses which are synchronized with the peak amplitude of the detected main lobes in signal $S_1$. The pulses from pulse generator 58 are, in turn, employed to open the normally closed gate 56, thus, gating-out the main lobes in the received signal, thereby permitting their amplitudes to be measured. This is done in amplitude comparison stage 57 which compares the amplitude of the gated main lobes with a reference source, thereby to control the gain of amplifier 60.

The output from amplifier 60, thus comprises, a series of pulses which are synchronized with the main lobes of the detected input signals and having precisely the same amplitude. These pulses are then coded in code generator 62, the code employed being identical to the code employed in the radar transmitter. The coded pulses from generator 62 are then compressed in matched filter 63. The output from matched filter 63, thus, comprises an exact replica of the strongest one of the compressed input signals, priorly designated $S_1$. When this signal is subtracted from the composite input signal, the $S_1$ component is completely cancelled and only the $S_2 + S_3 \ldots S_n$ components remain. Delay element 53 delays the output of filter 52 to compensate for the delay introduced by the other elements in the circuit.

The output of adder 54 contains all of the input signals which were not detected by threshold detector 52. Since all of the lobes in the stronger signals are thus linearly subtracted, smaller signals hidden in these lobes are exposed and can be detected in threshold detector 52' which is adjusted to a lower threshold than detector 52.

These detected outputs are then processed in the manner above-described to yield an output containing all the input signals except those detected in the first and second threshold detectors. This output may then be detected in yet a third threshold detector having a still lower threshold setting to yield an output containing the composite compressed input signal minus those detected in all three threshold detectors. This process may of course be reiterated as often as desired until the noise level of the system renders further signal processing of no value.

The invention has been disclosed in the context of a radar system, but one skilled in the art will appreciate that the techniques disclosed herein are not so limited and may be employed with any system employing coded pulses, for example, a tropo-scatter communications system, a data transmission system, etc., etc. Further, it will be appreciated that the situation where the composite signal $S = S_1 + S_2 + S_3 \ldots S_n$, and $S_1 > S_2 > S_i \ldots > S_n$ is somewhat artificial. In real life the components of the signal will have differing amplitudes. However, these components may be grouped into groups of approximately equal amplitude, and in that event, the threshold of detector 52 is adjusted to discriminate between the signals in the first and second group, the next detector is adjusted to discriminate between the second and third group of signals, and so on.

Finally, one skilled in the art may make various changes to the arrangement of circuit components shown without departing from the spirit and scope of the invention.

What is claimed is:

1. A method of adaptively eliminating unwanted lobes in a compressed, coded signal, comprising the steps of:
   a. generating a train of pulses corresponding in amplitude and phase to the peak amplitude of the main lobes in said coded signal;
   b. encoding each of the pulses in said train by the use of the same coding scheme employed to generate said coded signal;
   c. compressing said now encoded pulses in a matched filter; and then
   d. subtracting said compressed pulses from said coded signal, thereby to cancel from said coded signal the lobes which correspond to the lobes generated by the component of said coded signal contributing said peak amplitude signal.

2. The method according to claim 1 comprising the further step of:
   reiterating steps (a)–(d), seriatim, for the peak amplitude of the main lobes remaining in said coded signal after the subtraction dictated in step (d) has been effected.

3. The method according to claim 1 wherein said pulse train generating step further comprises:
   detecting said peak amplitude signal in a threshold detector having a first threshold setting;
   synchronizing said pulse train with the output of said threshold detector;
   comparing the amplitude of said coded signal with a reference signal; and then
   adjusting the amplitude of said pulse train in accordance with the results of said comparison.

4. The method according to claim 3 wherein said pulse generating step further comprises:
   prior to said amplitude comparing step, gating said coded signal in synchronism with said pulse train.

5. Apparatus for adaptively eliminating unwanted lobes in a compressed, coded signal, which comprises:
   a threshold detector for receiving said coded signal, said detector having its threshold set to detect lobes in said coded signal which exceed a predetermined amplitude level;
   a pulse generator, connected to and driven by the output of said threshold detector, for generating a train of pulses synchronized with the lobes in said coded signal which are of peak amplitude;
   means, connected to said pulse generator, for adjusting the amplitude of each pulse in said train to said peak amplitude;
   means, connected to the output of said amplitude adjusting means, for encoding each pulse in said pulse train using the same coding scheme employed to generate said coded signal;
   a matched filter, connected to the output of said encoding means, for compressing each encoded pulse in said pulse train; and
   means for subtracting said compressed pulses from said coded signal, thereby to eliminate lobes in said coded signal associated with the lobes detected by said threshold detector.

6. The apparatus according to claim 5 wherein said amplitude adjusting means further comprises:
   a source of a reference potential;
   an amplitude comparison stage having a first and a second input, said reference potential source being connected to said first input;
   gating means, connected to and synchronized by the output of said pulse generator, for gating said coded signal into the second input of said amplitude comparison stage; and
   a variable amplifier having its gain-setting input connected to the output of said amplitude comparison stage, for adjusting the amplitude of each pulse in said pulse train.

7. The apparatus according to claim 6 wherein said subtracting means further comprises:
   an inverting stage connected to the output of said matched filter; and
   a summing stage having a first input connected to the output of said inverting stage and a second output connected to the source of said coded signal.

8. The apparatus according to claim 7 further comprising a delay element interposed between said summing stage and the source of said coded signal, said delay element having a delay equal to the combined delay of the circuit elements interposed between said source of the coded signal and the first input of said summing stage.

9. Apparatus for adaptively eliminating unwanted lobes in a compressed coded signal S, where $S = S_1 + S_2 + \ldots S_i + \ldots S_n$, and $S_1 > S_2 > \ldots S_i > \ldots S_n$, which comprises:
   $(n - 1)$ signal cancelling stages, the $i^{th}$ one of said $(n - 1)$ stages comprising:

a threshold detector receiving as its input the coded signal from the preceding $(i-1)^{th}$ stage, said detector having its threshold level set to detect lobes in said coded signal which exceed a predetermined amplitude level E, where $S_{i-1} > E > S_i$;

a pulse generator, connected to and driven by the output of said threshold detector, for generating a train of pulses synchronized with the lobes in said coded signal which are of peak amplitude;

means, connected to said pulse generator, for adjusting the amplitude of each pulse in said train to said peak amplitude;

means, connected to the output of said amplitude adjusting means, for encoding each pulse in said pulse train using the same coding scheme employed to generate said coded signal;

a matched filter, connected to the output of said encoding means, for compressing each encoded pulse in said pulse train; and means for subtracting said compressed pulses from said coded signal, thereby furnishing the coded signal input to the following $(i+1)^{th}$ stage.

* * * * *